United States Patent [19]
Perkins

[11] 3,780,749
[45] Dec. 25, 1973

[54] PROCEDURE FOR ASSISTING RENEWAL OF OIL FLOW IN A PIPELINE

[75] Inventor: Thomas K. Perkins, Dallas, Tex.

[73] Assignee: Atlantic Richfield Company, New York, N.Y.

[22] Filed: Dec. 4, 1972

[21] Appl. No.: 312,049

[52] U.S. Cl.......................... 137/13, 137/1, 137/236
[51] Int. Cl................................................ F17d 1/16
[58] Field of Search .................. 137/1, 13, 15, 236, 137/154

[56] References Cited
UNITED STATES PATENTS

| | | | |
|---|---|---|---|
| 3,269,401 | 8/1966 | Scott | 137/13 |
| 2,958,333 | 11/1960 | Poettmann | 137/13 |

*Primary Examiner*—Alan Cohan
*Attorney*—M. David Folzenlogen et al.

[57] ABSTRACT

When the temperature is cold enough to gel quiescent oil, renewal of oil flow through a section of pipeline following uphill and downhill terrain is assisted after shutoff by a procedure conducted at an appropriate location along the pipeline where counterbalancing hydrostatic head pressures caused by elevation differences are exerted on both sides of the location. The hydrostatic head pressure exerted on one side of the location, preferably the upstream side, is first decreased by removing oil by pumping or drainage from that side while maintaining at some time during such removal a higher hydrostatic pressure on the other side of the location. Thereafter, shortly before restoring oil flow through the section, oil is caused to flow from the other side of the location into the side of decreased hydrostatic pressure.

9 Claims, 1 Drawing Figure

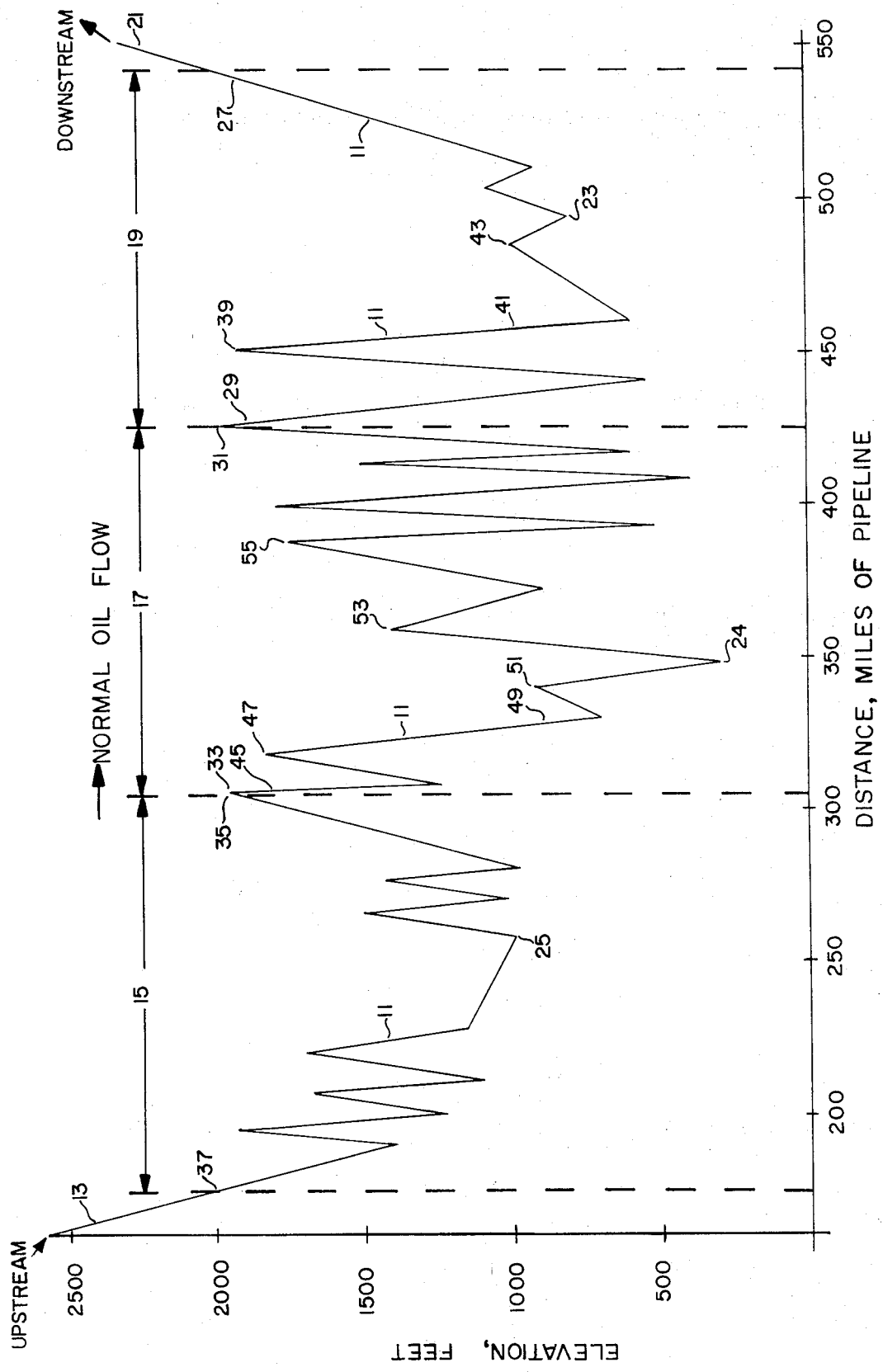

PROCEDURE FOR ASSISTING RENEWAL OF OIL FLOW IN A PIPELINE

BACKGROUND OF THE INVENTION

This invention relates to a method for assisting renewal of oil flow through a section of a pipeline after a period of temporary shut-in.

In cold regions where for long periods the prevailing ambient temperature is cold enough to cool static oil to a temperature approaching or below its pour point, cessation of oil flow through an oil gathering line, or feeder line, or trunk line will cause stationary oil in the pipeline to cool and gel. This gives rise to the problem of restarting oil flow when the pipeline is shutdown for a period long enough for the oil to gel. This problem is encountered in the pipelining of crude oils in cold climates like the Arctic regions and in the pipelining of certain fuels or synthetic high pour point oils. When oil flow through a gelled section of a pipeline is to be renewed, the static head pressure, the length of the gelled section, and the yield strength of the gelled oil may be such that it would require an undesirably high pressure to restore the flow of liquid oil through the pipeline. The renewal pressure should not exceed the design pressure of the pipeline, the pumping stations, and related equipment. The desired renewal pressure for a system varies with the size of the line and the design conditions as well as various operating limitations, safety valves and equipment installed with the line.

Pipelines are laid up and down slopes, valleys, river beds, and mountains. This results in elevation differences between sections of the pipeline. For example, in one proposed oil pipeline for Alaska near the Yukon River a hydrostatic head or gravity pressure in excess of 600 psi could occur. When oil flow through the pipeline is to be renewed, this hydrostatic pressure can severely limit the amount of additional pressure that can be applied to the line. In addition, if the static head pressure arises from a downstream direction, the hydrostatic pressure resists renewal of oil flow.

When oil flow through a pipeline is to be renewed, oil is pumped into the pipeline until the yield pressure is reached. Under certain conditions, especially where downstream sections of the pipeline are experiencing high hydrostatic pressures, initial pump injection rates will be low and it may take long periods of time to restore the desired oil flow rate. Yet, there is a minimum flow rate compatible with the installed pumps that must be maintained. Otherwise, the pump temperature starts to rise rapidly burning out seals and bearings and the like unless the pump is shut down by temperature safety devices. The minimum desirable flow rate that must be maintained can be quite large and on the order of tens of thousands of barrels of oil per day.

Even if other startup systems are used, there is a maximum allowed time for restoring and bringing oil flow back up to the desired level. Down time is costly and creates collateral problems. The startup system should be reliable and the time required to restore flow should be reasonable and reliably predictable.

SUMMARY OF THE INVENTION

Renewal of flow of oil through a section of a pipeline which has been shut off for a period is assisted by a procedure which reduces pump startup pressure and time, and permits maintenance of a higher than normal startup flow rate. The procedure is applicable when the ambient temperature is cold enough to gel quiescent oil and is applicable to a section of pipeline which generally follows uphill and downhill terrain and along which there is a suitable low location where opposing hydrostatic head pressures are exerted from both sides of the location. The hydrostatic pressures arise from elevation differences between the location and segments of the section on both sides of the location. Normally, at equilibrium, these opposing hydrostatic pressures balance each other.

The normal startup pressure through a section containing oil depends on the yield strength of the oil, the internal pipe diameter, the continuous length of an oil segment or section, and the hydrostatic head pressure. The yield strength depends on a number of factors.

The method of this invention for assisting renewal of oil flow through a section of pipeline has the advantages of degrading or reducing the yield strength of oil and reducing the continuous length of a section of oil or of one or more segments of oil, thereby decreasing the pressure required to renew oil flow through the section and permitting restoration of oil flow at a higher continuous flow rate compatible with the pipeline pumps and design.

Briefly, oil is removed from one side of a low location in a pipeline thereby decreasing the hydrostatic pressure exerted from this one side, preferably the upstream side, while maintaining at some time during such removal a higher hydrostatic pressure on the other side of the location. This higher hydrostatic pressure is maintained by preventing uncontrolled flow of oil from the other side. The oil may be removed and the hydrostatic pressure decreased by pumping oil from the one side to the other side or from the pipeline, or by drainage of oil from the pipeline at or near the location, or by both methods. Preferably, this step in the process is carried out at or shortly after the time of shutoff of flow through the section while the oil is still liquid. This step reduces the continuous length of a section of the oil or of one or more segments, and if the step is conducted near the end of the shut-in period, the step reduces the yield strength of cold oil in the yielded side.

The act of reducing the hydrostatic pressure on the one side of a location enables maintenance of a higher hydrostatic pressure on the other side during the shut-in period. For purposes of this invention, the shut-in period ceases before oil flow is restored through the section and at the time when a subsequent step is conducted. In the subsequent step, oil is caused to flow from the side of higher hydrostatic head pressure into the side of lower hydrostatic pressure. This subsequent step reduces the startup hydrostatic head pressure and startup yield strength of the oil left on the other side of the position and usually shortens the continuous length of oil remaining in the section after the earlier step.

BRIEF DESCRIPTION OF THE DRAWING

The drawing depicts changes in elevation as a fragment of a pipeline generally follows uphill and downhill terrain and is useful in an understanding of the procedures and advantages of this invention.

DETAILED DESCRIPTION OF THE INVENTION

Oil flowing in a pipeline at normal temperatures behaves as a Newtonian fluid. When oil flow is shut off in a pipeline which passes through a region where the ambient temperature is below the pour point of the oil, the static oil cools increasing in yield strength and tends to gel into a thixotropic material with a relatively high resistance to flow. This quiescent thickened or gelled oil hampers or blocks renewal of oil flow from an upstream point through a section of the pipeline to a downstream point.

When oil flow through the section is to be renewed, the total startup pressure required to commence movement of the stationary oil is dependent upon the yield properties of the stationary oil, the continuous length of sections or segments of increased yield strength oil which may change with time as previously separate segments are forced together, any hydrostatic head pressures resisting restoration of oil flow, and, to a point, on the rate of application of the startup pressure. The maximum startup pressure differential that can be applied to a section of oil is the maximum design pressure of the pumping stations or the safe operating pressure of the pipeline and related equipment, whichever is less, minus the hydrostatic head pressure.

This invention provides a method for assisting renewal of flow of oil through pipeline 11 which is schematically illustrated in the drawing as generally following uphill and downhill terrain and undergoing substantial elevational changes. The pipeline may be laid on the ground, or buried, or only partially or intermittently insulated or buried with some sections laid on the surface or elevated on gravel berms or suspended above the ground on pile bents. Oil flow from upstream point 13 through sections 15, 17, and 19 of the pipeline to downstream point 21 has been temporarily shut off while the pipeline was carrying oil. Oil flow from upstream point 13 to downstream point 21 is scheduled for renewal whenever the cause of shutoff of flow has been remedied. The length of the shut-in period is frequently uncertain at the time of shutdown. For purposes of this description, the ambient temperature of each of the sections during the shut-in period is cold enough to cause at least a portion of the quiescent oil in each section to thicken into a gel-like substance thereby increasing in yield strength.

When oil flow through pipeline 11 is shut off, the uphill and downhill configuration of the pipeline may be such that during shutdown, it is desirable to initially lower the static oil levels in the pipeline. This may be accomplished by continuing to pump oil over the next ridge or peak or by removing oil from the pipeline. For purposes of illustration, it is assumed that during shutdown oil was removed from the pipeline at location 23 until the static oil level is section 19 is at the 1900 foot elevation mark. Consequently, if no further steps were taken and if shrinkage is neglected, the static oil levels in section 19 would in the drawing be at points 27 and 29, in section 17 at points 31 and 33, and in section 15 at points 35 and 37. As illustrated, each pipeline section contains a long continuous section of oil which traverses several low locations or positions along the section. Although these locations are depicted by sharp points, the locations may extend for a substantial distance. These locations are called low locations because on each side of a location the pipeline elevation rises creating an elevation difference on both sides of the location. These elevation differences cause opposing hydrostatic oil head pressures from each side of the location. One or more suitable low locations in each section are selected for use in the procedure of this invention. A selected low location does not need to be the lowest location in the section. The bases for selecting a location or site for performance of the steps of this invention will be made apparent from the following description and the objectives of the method of this invention.

Basically, this invention provides a method for assisting renewal of oil flow through a section of pipeline, for example, section 15, 17 or 19, by reducing the yield strength of at least a portion of the oil in the section, the total startup pressure, and the startup yield pressure. These reductions in turn decrease the startup time and permit maintenance of a higher than normal startup flow rate. The normal startup pressure through a section of a pipeline containing oil depends on the yield strength of static oil in the section, the internal pipe diameter, the continuous length of each oil segment to be started into motion, and the hydrostatic head pressure. The normal startup time and flow rate depend on the yield pressure and rheological properties of the oil, the pump and pipeline design pressures, the pump rate, pipeline capacity, and compressibility and expansion of the system.

A segment or length of oil between two points will exhibit a certain yield strength. The conditions and factors affecting yield strength will hereafter be discussed. The pressure differential across the length of a segment of oil can be increased until the oil segment begins to visibly move. When the pressure is increased in a reasonably rapid fashion, the pressure differential at which an oil segment visibly starts to flow after a static period at that temperature is herein called the yield pressure. The yield pressure is dependent on the yield strength of the oil. The force pushing the oil in piston-like displacement is the product of the internal area of the pipeline multiplied by the pressure differential ($\Delta P$), and at the point of yield, this force is equal to the shear resistance of the oil segment. The shear resistance of the oil segment is approximately equal to the product of the apparent yield strength or shear stress ($\tau$) of the oil multiplied by the internal surface area of the pipeline for the continuous length (L) of the segment chosen, that is, $\pi DL$ where D is the internal diameter of the pipeline. As used herein, the apparent yield strength incorporates allowance for visible movement of the oil and a reasonable rate of application of the startup pressure. The following Equation 1 is an expression of the equality of force and shear resistance at the yield pressure:

$$\tau \pi DL = (\Delta P \ \pi D^2/4) \qquad 1$$

Equation 1 can be simplified into the following Equation 2:

$$\Delta P = (\tau)(4L/D) \qquad 2$$

Equation 2 is useful for roughly estimating the yield pressure between points. For example, for most pipelines, during startup after a shut-in period, the ratio of 4L to D is quite large and may depend essentially on the distance between pumping stations which in turn depends on a number of factors including size of the pipeline, the flow rate, the design operating pressure, topographical and rheological factors, and economics.

Equation 2 is also useful for understanding how the procedure of this invention assists in renewal of oil flow. Generally, this procedure first reduces the continuous length, L, of a static oil segment thereby decreasing the startup yield pressure of that segment; next, the procedure reduces the startup shear stress ($\tau$), thereby also decreasing the startup yield pressure, and decreases the hydrostatic head pressure at the time of startup thereby decreasing the total startup pressure. It is possible in this invention to reduce the startup length, shear stress, and hydrostatic head pressure in one step.

In operation, oil flow through pipeline 11 and sections 15, 17 and 19 is temporarily shut off. As previously mentioned, if conditions warrant it, oil may be removed from the sections to lower the hydrostatic head pressure of the oil left in the sections. For sake of this illustration it is assumed that the static oil level in section 19 is at points 27 and 29, in section 17 is at points 31 and 33, and in section 15 is at points 35 and 37. It should, however, be noted that pipeline contours vary widely. The elevation changes depicted in the drawing are used only for illustrative purposes.

In the first step of the process of this invention, oil is removed and the oil hydrostatic head pressure is decreased on one side of at least one low location in a section of the pipeline. As previously mentioned, at the low location opposing hydrostatic head pressures caused by elevation differences are normally exerted on both sides of the location. For sake of illustration, the selected location for section 19 is location 23, for section 17 is location 24, and for section 15 is location 25. The locations may be pump stations, or drainage points, or both, for reasons hereinafter set forth. The oil may be removed and the hydrostatic head pressure decreased from the one side of a location by pumping oil from the pipeline or from the one side to the other side, or by draining oil from the pipeline at or near the location, or by both pumping and draining. When the oil is removed by drainage, the hydrostatic head pressure may be decreased by using the hydrostatic pressure exerted on the one side to cause oil from the one side to drain from the pipeline. The oil may be removed and the hydrostatic head pressure decreased from the upstream side or the downstream side of the location. When pumps are used to remove the oil, it is especially preferred that the oil be removed from the upstream side. The first step may be performed at or shortly after the time of shutoff of oil flow and while the oil is still liquid, or shortly before the time of startup, or at any time in between. The amount of oil removed will be adapted to the startup conditions and equipment. A choice preference between one or more of the above-described possible combinations will largely depend on practicality, and on the pipeline arrangement and the equipment previously installed in the pipeline for emergency or shut-in use. The factors and conditions to be considered when making a choice preference will be made apparent by the following description of the other steps of the method and by an illustration of the method hereinafter set forth.

At some time during removal of oil from the one side and during the act of reducing the hydrostatic head pressure exerted on the location from this one side, there must be created, if not already present, and maintained a hydrostatic head pressure difference between the two sides. The higher hydrostatic head pressure must be exerted on the other side of the location. IF the two opposing hydrostatic head pressures were originally equal, the act of removing oil from the one side without allowing a corresponding removal of oil from the other side will create and maintain the required hydrostatic head pressure difference. This can be accomplished by not allowing oil to flow from the other side into the side of reduced head pressure and by not allowing uncontrolled flow of oil from the other side. If during removal of oil from the one side oil is pumped from the one side into the other side, the act of removing oil and reducing head pressure on the one side could add oil to the other side and increase the head pressure exerted on the other side of the location. This building up of hydrostatic head pressure exerted on the other side could be highly advantageous, as hereinafter shown, if the hydrostatic pressure on that side would not otherwise have been sufficient to cause the oil in the other side to yield after the shut-in period. On the other hand, pumping oil from the one side into the other side may not increase the hydrostatic head pressure exerted on the other side if the oil spills over a peak elevation on the other side and does not increase the static elevation level of oil in the other side.

For reasons made apparent in the next step of the method of this invention, the higher hydrostatic head pressure exerted on the other side of the location must also be maintained during the shut-in time, if any, between removal of oil from the one side and termination of the shut-in period. As previously indicated, there may be no specific time delay between the act of removing oil from the one side and the termination of the shut-in period which ends with the next step of the process because under some conditions the first step may be delayed until just prior to termination of the shut-in period.

In the next step of the method, at least a portion of the oil in the other side from whence the higher hydrostatic pressure is exerted is caused to flow into the one side where the lower hydrostatic head pressure is exerted. This decreases the hydrostatic head pressure exerted on the location from the other side. Preferably, oil in the other side is at least partially caused to yield and flow into the one side by the hydrostatic head pressure difference or imbalance between the two sides.

Thereafter, liquid oil flow from an upstream point through the section to a downstream point is restored in the usual fashion. Such renewal of flow has, however, been assisted by the procedure previously conducted in one or more sections of the pipeline because the total required startup pressure and startup yield strength have been reduced thereby allowing a higher startup flow rate than would otherwise have been experienced. This assistance in renewal of oil flow may best be further illustrated by having reference to the drawing where it will be assumed that in the first step oil is removed and the hydrostatic head pressure is decreased in a side which is in an upstream direction from the location. In other words, in section 19, at least a portion of the oil between location 23 and point 39 is first removed from this upstream side. In section 17, at least a portion of the oil between location 24 and point 33 is first removed. In section 15, at least a portion of the oil between location 25 and point 37 is first removed.

Before this first step, the continuous length of the oil in section 19 extended between points 27 and 29 or as illustrated about 110 miles. Removal of oil from this upstream side of location 23 does not remove oil between points 29 and 39, but the continuous length of the oil segment between 27 and 29 is first broken at point 39 as the oil level at 39 starts to drop. At this instant, there are two segments of oil in section 19. The longest continuous oil segment in section 19 extends from this oil level at point 39 to point 27 which is as illustrated about 24 miles shorter than the previous continuous segment between points 27 and 29. At this level drops, the length of this longest oil segment in section 19 continues to decrease to point 41. Thereafter, a break in the oil segment starts at point 43 leaving the segment extending between points 41 through 43 intact. If all of the oil on the upstream side of location 23 is removed in the manner just described, as illustrated, there will be two oil segments left in the side of section 19 upstream of location 23. These oil segments extend between points 29 and 39 and points 41 and 43. From Equation 2 above, it can be seen that the startup pressure differential for each segment is substantially less than the pressure differential that would have been required to push oil through the portion of the pipeline occupied by these segments.

In addition, if all of the oil in the upstream side of location 23 is removed, there will be no hydrostatic head pressure exerted from the side of section 19 upstream of location 23, provided that the oil in the downstream side of section 19 is not allowed to flow back into the upstream side. Even if some of the oil in the downstream side were permitted to flow back into the upstream side, the hydrostatic head pressure exerted from the upstream side of location 23 would be substantially reduced. In this process under the situation just described, the hydrostatic head pressure exerted from the downstream side is maintained at a level higher than the hydrostatic head pressure exerted on the upstream side of location 23.

Except for differences in valleys and peaks, similar effects are derived if oil is removed between location 25 and point 37 in section 15, and location 24 and point 33 in section 17.

As mentioned previously, the oil may in the illustration be removed by drainage of oil at or near a location or by pumping oil from the upstream side, or by both means. If oil is drained, the oil will be stored and later returned to the pipe-line once liquid oil flow has been restored or moved to a downstream location and returned to the pipeline. The amount of oil removed from the pipeline, if any, will depend on the availability of oil storage which is expensive or on how easy it is to transport the oil from one section of the line to another section. If pumping equipment is carried to or is available at each location, the requirements for storage facilities can be minimized. As indicated, the pumping equipment could be a regular pipeline pumping station, or the pumping equipment could be auxiliary permanent or portable equipment of much lesser capacity installed for this process. Upon or shortly after shutoff of flow while the oil is still liquid, oil between location 25 and point 37 could be pumped from the upstream side of location 25 to the downstream side until the suction pressure of the pumping equipment drops to a preset level, for example, 60 psi. The oil flowing into the downstream side of location 25 will force oil out of section 15 into section 17 and oil in section 17 will be forced into section 19, and the oil in section 19 into another downstream section. Normally, pumps at locations 23 and 24 will be operated during this period. When the pumping equipment at location 25 is shut off, backflow of oil into the upstream segment of section 15 will be limited to maintain a high backward oil hydrostatic head pressure from the downstream side of location 25. Preferably, for reasons hereinafter made apparent, this oil hydrostatic head pressure will be kept as high as practical. If the hydrostatic head pressure is undesirably high, a limited amount of oil may be allowed to drain back into the upstream side of location 25.

As soon as oil quits flowing past point 35 from section 15, the oil level between location 24 and point 33 starts to drop as oil is pumped past location 24 and oil is removed from the upstream side of location 24. As before, the pumping equipment at location 24 is operated until the suction pressure drops below the desired level. As illustrated, in the side of section 17 upstream of location 24 this would leave oil between points 45 and 47, between 49 and 51, and a small amount of oil upstream of location 24. When the pumping equipment at location 24 is shut off, the pumping equipment at location 23 would begin to remove oil from the upstream side of location 23 as previously described.

Relative to the above illustration, it should be noted that pipelines have pumping stations properly located to prevent buildup of excessive hydrostatic head pressures, but there may be times when a break or malfunction occurs at a point where the oil cannot be forced in the manner described from one section into another section and drainage or removal of oil from the pipeline at the last available downstream location is preferred. The oil, if any, drained at this or any other location may be stored in permanent or temporary storage facilities or it may be trucked around the failure of malfunctioning point and returned to the pipeline.

At this point in the illustration of how the method of this invention accomplishes its objectives and advantages, it will be assumed that the oil in the upstream sides of sections 15, 17 and 19 have been removed except for the segments between peaks that are not removable by drainage or pumping at the three locations. It will also be assumed that the oil levels in the downstream sides of locations 23, 24 and 25 have been maintained since the time of oil removal at points 27, 31 and 35, respectively. In other words the liquid oil hydrostatic head pressure exerted from the downstream side of location 23 would be about 420 psi, from the downstream side of location 24 would be about 620 psi, and from the downstream side of location 25 would be about 360 psi. It will further be assumed that the pipeline has been shut off long enough for the oil in these downstream sides to gel. The gel temperature and other conditions affecting gel strength for increments of a segment of the oil left in each section are likely to be different; but, for sake of illustration, it will be assumed that the gel strength of each segment is uniform. The shut-in period is to be terminated by performance of the next step in the process. In the next step, at least a portion of the oil left in the downstream side is caused to flow into the upstream side. This decreases the hydrostatic head pressure exerted on each location from the downstream side and also decreases the total hydrostatic pressure in the pipeline at each location. This backflowing of the gel has a further advantage in that it degrades or reduces the yield strength of the gel as hereinafter described. The hydrostatic pressure if it is sufficiently high can be used to cause this gelled oil to yield and flow back into the upstream side. It is much preferred that the hydrostatic head pressure be high enough to cause the gelled oil to yield and flow. A way of building up head pressure and maintaining it has been previously described.

Using Equation 2 above, it can be roughly estimated that the 420 psi hydrostatic head pressure in section 19 can cause a gel with an apparent yield strength of about 122 dynes per square centimeter to rapidly yield. In section 17, the 620 psi hydrostatic head pressure exerted between point 31 and location 24 can cause a gel with an apparent yield strength of about 104 dynes per square centimeter to rapidly yield, the 420 psi head pressure between point 53 and location 24 can cause a gel with an apparent yield strength of about 555 dynes per square centimeter to rapidly yield, and the 550 psi head pressure between point 55 and location 24 can cause a gel with an apparent yield strength of about 109 dynes per square centimeter to rapidly yield. In section 15, the 360 psi hydrostatic head pressure can cause a gel with an apparent yield strength of about 98 to rapidly yield. Given sufficient time, these hydrostatic pressures can cause gels of much higher apparent yield strength to yield; therefore, commencement of the just mentioned next step of the method can be appropriately timed.

As previously indicated, the act of yielding and backflowing at least a portion of the gelled oil in the downstream side reduces the yield strength of the yielded gel, and as indicated by Equation 2 above, decreases the pressure differential required to start the yielded oil moving. This reduction in yield strength is due to the fact that the gelled oil is thixotropic and shear rate degradable. Once the gelled oil begins to move, shear degradation takes place where there is a velocity gradient between layers of the gel. This shear degradation quickly and significantly reduces the yield pressure of the degraded gelled segment by about 40 to 60 percent. The rate of shear degradation depends on the rheological properties of the oil and its gel characteristics, and on the rate of movement of the yielded segment. It has been found that the rate of shear degradation initially undergoes rapid degradation in very short distances, for example, a few tens of feet or more. Thereafter, the rate of shear degradation tapers off to a relatively gradual rate. The degraded gelled oil does not rebuild its yield strength for a period long enough for liquid oil flow through each section to be restored while the yield strength is reduced. The advantages gained in this reduction in hydrostatic head pressure and in yield strength and its consequential reduction in yield pressure at the time of renewal of liquid oil flow from upstream point 13 to downstream point 21 should now be self-evident.

As previously indicated, anticipation of the yield strength of segments of oil left in each section is useful in choosing preferred alternatives for carrying out the method of this invention. The following conditions affect the yield strength and consequently the yield pressure of a segment of static gelled oil. Crude oils are usually a complex mixture of oils, waxes, asphalts, bitumens, and resins with a wide range of melting points, cloud points, or pour points. Some of the effects observed when investigating the factors influencing the gel strength and yield pressure of an oil are complex and not fully understood. Concepts or explanations have been proposed which explain at least in part what has been observed and it has been fully demonstrated that the yield pressure of an oil developed during period of quiescence vary widely with the composition of the oil, the temperature, the thermal history of the oil, the rate of cooling, the previous shear history of the oil, aging of the oil, and the compressibility of the system.

The effects of asphalt, waxes, and the like components on the pour point of oil is well known. In addition, the gel strength of an oil is sensitive to the presence or absence of light ends. Weathering, flashing, or removal of light ends leads to a significant increase in gel strength. Moreover, flashing of live crude oil from a producing well to atmospheric pressure in one step leads to a higher yield strength than multi-step flashing. Of course, the presence of large percentages of water would affect yield, but water is usually separated from the oil before the oil is passed through the pipeline. The mixing of even a small quantity of high yield strength oil tends to lead to a mixture having the yield strength like the high yield strength oil.

In general, decreasing the gel temperature and increasing the rate of cooling increase the yield strength and in turn cause a higher yield pressure.

As to shear history, it has been found that subjecting the oil to high shear conditions tends to increase the yield strength of the gelled oil after it is subsequently cooled to a low temperature. The observed affect of shear depends in part on the temperature of the oil during the time of shear application. The temperature in turn is affected by the composition of the oil.

Aging and thermal history are in some respects alike. As used herein, however, aging relates to time at a given temperature. In general, for a period of time the gel strength of a gel increases. Results indicate that the gel strength begins to stabilize in about eight to ten hours of residence time.

The thermal history of an oil primarily relates to cycles in temperature with the peaks in high and low temperatures encountered being important. Generally, if an oil is returned to a high temperature and held at that temperature for a period of time, the effects of prior thermal history are for practical purposes erased. The temperature to which the oil must be raised depends on the composition of the oil. If the temperature of the oil is cycled in a manner such that the oil never reaches the restoration temperature, cycling tends to cause an increase in yield pressure when the oil is subsequently cooled and gelled. The effects of cycling on yield pressure depend in part on the temperature to which the oil is raised during a cycle. The effects of a peak temperature during a cycle depend on the composition of the oil. In general, for normal crude oil, it has been found that cycling of the crude oil at a temperature below 40°F increases the ultimate yield pressure of the oil when the oil is cooled and gelled. The mechanism by which the yield increase occurs can be explained in the following manner. Upon initial monotonic cooling, wax comes out of solution but relatively few wax crystals form. The crystals are consequently large and no continuous gel structure is possible. Continued cooling brings the asphalts out of solution. Upon reheating, the wax goes back into solution, but the asphalt micelles presumably do not (or at least not very rapidly). Subsequent cooling brings the wax out of solution again, but this time the asphalt micelles serve as nucleation sites for the wax crystals. Consequently there are many small crystals which can link together (perhaps together with the asphaltenes) into a gel like network. This results in a paraffin-asphalt gel structure of considerable strength at low temperatures; consequently, the ultimate yield pressure of a gelled oil which has been subjected to this type of cycling is quite high.

Equations have been developed and published which for purposes of this invention adequately predict yield behavior of gelled, thixotropic oils in pipelines. In general, the shear strength of a certain oil at a certain temperature is approximately a point function of shear rate and shear strain. The relationships involved have been verified experimentally by first returning the oil to its original condition. This is best accomplished by reconstitution of the oil, if desired, and by reheating the oil to some temperature level, for example, the reservoir temperature or some other preceding high process temperature. This temperature level is held for a period of time to overcome the effects of prior yield affecting factors. Thereafter, subsequent factors like rate of cooling, shearing, mixing, temperature cycling, and the like, which measurably influence yield strength, can be controlled and varied or simulated to develop the desired correlations.

The foregoing describes a method with preferred embodiments for assisting renewal of oil flow through a section of pipeline which was temporarily shut down. Reasonable variations and modifications are practical within the scope of this disclosure without departing from the spirit and scope of the claims of this invention.

The embodiments of the invention in which an exclusive property or privilege is claimed are defined as follows:

1. A method for assisting renewal of flow of oil after a shut-in period through a section of a pipeline which generally follows uphill and downhill terrain and in which oil flow through said section of said pipeline carrying oil has been shut off, the ambient temperature of said section being cold enough to cause at least a portion of quiescent oil in said section to gel, which method comprises removing oil and decreasing the hydrostatic head pressure exerted from one side of a location in said section of said pipeline where opposing hydrostatic head pressures caused by elevation differences would normally be exerted on both sides of said location, maintaining a higher hydrostatic head pressure on the other side of said location than is exerted on said one side during at least a portion of the time when the hydrostatic head pressure from said one side is being decreased and during the time, if any, between removal of oil from said one side and termination of said shut-in period, causing at least a portion of the oil in said other side to flow into said one side and decreasing the hydrostatic head pressure exerted on said location from said other side, and thereafter restoring liquid oil flow through said section of said pipeline.

2. The method according to claim 1 wherein said one side is in an upstream direction from said location and said other side is in a downstream direction from said location.

3. The method according to claim 1 wherein said location is a drainage location and the hydrostatic head pressure in said one side is decreased by using the hydrostatic head pressure exerted on said drainage location from said one side to cause oil from said one side to drain from said section from said pipeline.

4. The method according to claim 3 wherein said one side is in an upstream direction from said location and said other side is in a downstream direction from said location.

5. The method according to claim 1 wherein the oil is removed from said one side while the oil in said section is still essentially a liquid.

6. The method according to claim 5 wherein said one side is in an upstream direction from said location and said other side is in a downstream direction from said location.

7. The method according to claim 5 wherein said location is a pump station and the hydrostatic head pressure in said one side is decreased by pumping oil from said one side to said other side.

8. The method according to claim 5 wherein said location is a drainage location and the hydrostatic head pressure in said one side is decreased by using the hydrostatic head pressure exerted on said drainage location from said one side to cause oil from said one side to drain from said section from said pipeline.

9. The method according to claim 8 wherein said one side is in an upstream direction from said location and said other side is in a downstream direction from said location.

* * * * *